United States Patent
Qian et al.

(10) Patent No.: US 10,805,981 B2
(45) Date of Patent: *Oct. 13, 2020

(54) METHOD AND APPARATUS FOR CLOSING A TRANSMISSION CONTROL PROTOCOL CONNECTION FOR A WIRELESS COMMUNICATIONS NETWORK

(71) Applicant: AT&T Intellectual Property I, L.P., Atlanta, GA (US)

(72) Inventors: Feng Qian, Basking Ridge, NJ (US); Subhabrata Sen, New Providence, NJ (US); Oliver Spatscheck, Randolph, NJ (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/278,624

(22) Filed: Feb. 18, 2019

(65) Prior Publication Data
US 2019/0182891 A1 Jun. 13, 2019

Related U.S. Application Data

(63) Continuation of application No. 15/424,172, filed on Feb. 3, 2017, now Pat. No. 10,212,756, which is a continuation of application No. 14/095,770, filed on Dec. 3, 2013, now Pat. No. 9,565,716.

(51) Int. Cl.
*G06F 15/16* (2006.01)
*H04W 76/38* (2018.01)
*H04W 80/06* (2009.01)

(52) U.S. Cl.
CPC ............ *H04W 76/38* (2018.02); *H04W 80/06* (2013.01)

(58) Field of Classification Search
None
See application file for complete search history.

(56) References Cited

U.S. PATENT DOCUMENTS

| | | |
|---|---|---|
| 7,085,960 B2 | 8/2006 | Bouat et al. |
| 7,860,007 B2 | 12/2010 | Singh et al. |
| 8,279,869 B1 | 10/2012 | Tran et al. |
| 8,509,789 B2 | 8/2013 | Ibe et al. |
| 8,812,720 B2 | 8/2014 | Rafsky |
| 9,137,742 B1 | 9/2015 | Zhu |

(Continued)

*Primary Examiner* — Phuoc H Nguyen

(57) ABSTRACT

A method, computer-readable storage device and apparatus for closing a transmission control protocol connection in a wireless network are disclosed. For example, the method sends a first transmission control protocol option requesting a use of a silent transmission control protocol closure for the transmission control protocol connection, receives a confirmation from a recipient device that silent transmission control protocol closure is to be used for the transmission control protocol connection, sends a second transmission control protocol option that indicates a connection timeout period for the sender device, receives a connection timeout period for the recipient device, tracks the connection timeout period for the sender device and the connection timeout period for the recipient device, and closes the transmission control protocol connection when one of the connection timeout period for the sender device or the connection timeout period for the recipient device has expired.

20 Claims, 4 Drawing Sheets

(56) References Cited

U.S. PATENT DOCUMENTS

| | | |
|---|---|---|
| 9,872,222 B2 | 1/2018 | Oyabu |
| 10,448,329 B2 * | 10/2019 | Hong ................ H04W 52/0225 |
| 2010/0099421 A1 | 4/2010 | Kupsh et al. |
| 2011/0007714 A1 | 1/2011 | Nagasawa |
| 2011/0170433 A1 | 7/2011 | Scobbie |
| 2011/0249559 A1 | 10/2011 | Sun et al. |

* cited by examiner

METHOD AND APPARATUS FOR CLOSING A TRANSMISSION CONTROL PROTOCOL CONNECTION FOR A WIRELESS COMMUNICATIONS NETWORK

This application is a continuation of U.S. patent application Ser. No. 15/424,172, filed Feb. 3, 2017, now U.S. Pat. No. 10,212,756, which is a continuation of U.S. patent application Ser. No. 14/095,770, filed Dec. 3, 2013, now U.S. Pat. No. 9,565,716, all of which are herein incorporated by reference in their entirety.

BACKGROUND

In TCP, when an endpoint device wishes to terminate the connection, the endpoint device will transmit a FIN packet, which the other end, e.g., a web server, will acknowledge with an ACK packet. Furthermore, TCP also allows the use of a RST packet to abort a TCP connection for a number of different reasons, e.g., to close a half open connection and the like. FIN and RST packets that close TCP connections are often delayed by timeout. In cellular networks, delayed FIN/RST packets often incur significant energy consumption overhead for handsets (broadly mobile endpoint devices). On the other hand, closing TCP connection immediately after the last data transfer avoids the energy overhead, but can cause performance degradation as doing so makes reusing TCP connections difficult.

SUMMARY

In one embodiment, the present disclosure describes a method, computer-readable storage device and apparatus for closing a transmission control protocol connection in a wireless network. For example, the method sends a first transmission control protocol option requesting a use of a silent transmission control protocol closure for the transmission control protocol connection, receives a confirmation from a recipient device that silent transmission control protocol closure is to be used for the transmission control protocol connection, sends a second transmission control protocol option that indicates a connection timeout period for the sender device, receives a connection timeout period for the recipient device, tracks the connection timeout period for the sender device and the connection timeout period for the recipient device, and closes the transmission control protocol connection when one of the connection timeout period for the sender device or the connection timeout period for the recipient device has expired.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly describes a method, a computer-readable storage device and an apparatus for closing a Transmission Control Protocol (TCP) connection in a wireless communications network, e.g., a cellular network. Although the present disclosure is described below in the context of a cellular network, the teaching is not so limited. Namely, the teachings of the current disclosure can be applied for other types of networks, wherein the proper closure of TCP connections will avoid an energy overhead as described below.

As usage of wireless communication networks, e.g., 3G (third generation) cellular networks and Long Term Evolution (LTE) networks, continues to grow, a customer's ability to access and utilize the network depends on the efficient management of limited cellular network resources. The TCP protocol accounts for a large majority of traffic on cellular networks. However, TCP was not designed for cellular networks and various aspects of the TCP protocol have poor cross-layer interactions with the underlying cellular network resource allocation. This result in the inefficient use of limited cellular network resources.

Figure 1:
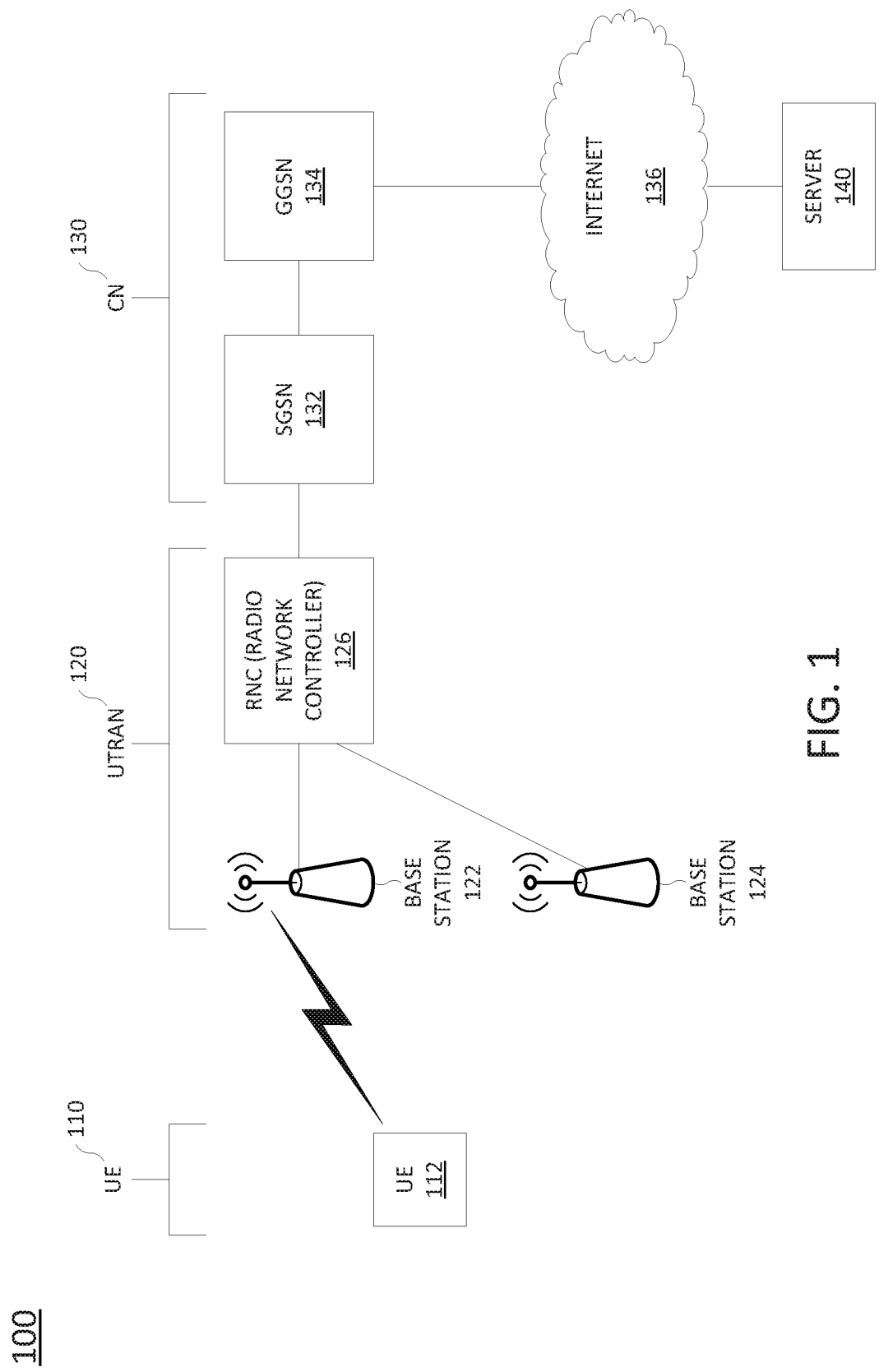
FIG. 1 is a block diagram depicting an illustrative cellular network related to the current disclosure.

FIG. 1 is a block diagram depicting an illustrative cellular network 100 related to the present disclosure. In one embodiment, the cellular network 100 can be a 3G cellular network, e.g., a universal mobile telecommunications system (UMTS) network. However, it should be noted that the cellular network 100 may include other types of cellular networks such as general packet radio services (GPRS) networks, global system for mobile communication (GSM) networks, enhanced data rates for GSM evolution (EDGE) networks, Long Term Evolution (LTE) networks, and so on.

In one embodiment, the network 100 includes three subsystems comprising: a user endpoint (UE) device subsystem 110, a UMTS terrestrial radio access network (UTRAN) subsystem 120 and a core network (CN) 130.

In one embodiment, the UE subsystem 110 includes one or more user endpoint devices 112. The user endpoint devices 112 may include a mobile telephone, a smart phone, a messaging device, a tablet computer, a laptop computer, an air card and the like. The user endpoint devices 112 may communicate wirelessly with the cellular network 100.

In one embodiment, the UTRAN subsystem 120 includes one or more base stations 122 and 124 and a radio network controller (RNC) 126. The UTRAN subsystem 110 provides connectivity between the user endpoint devices 112 and the core network 130. The UTRAN subsystem 120 provides features such as packet scheduling, radio resource control (RRC) and handover control via the RNC 126. Again, the illustration of the radio network controller (RNC) 126 in FIG. 1 is only illustrative. It should be noted that cellular network such as LTE may employ other entities such as a MME (Mobility Management Entity) instead of the RNC.

In one embodiment, the core network 130 includes a serving GPRS support node (SGSN) 132, a gateway GPRS support node (GGSN) 134 in communication with the Internet 136. A server 140, e.g., a web server is in communication with the Internet 136. The GGSN 134 serves as a gateway hiding UMTS internal infrastructures from an external network.

The core network 130 serves as the backbone of the cellular network 100. It should be noted that FIG. 1 is a simplified representation of the network 100 and is not intended to illustrate all of the components of the network 100. For example, although two base stations 122 and 124 are illustrated, the network 100 may include any number of base stations (e.g., a node B or an eNodeB for an LTE network) and so on. Moreover, the cellular network 100 may also include additional hardware or network components that are not illustrated. In other words, FIG. 1 is an illustration of an exemplary simplified cellular network 100.

The radio resource allocation to the user endpoint devices is handled via a radio resource control (RRC) functionality implemented in radio network controllers. For the example in FIG. 1, the RRC functionality is implemented in the RNC 126. It is important to note that the radio resource usage, device energy consumption and user experiences are all based on the state of the user endpoint device. To efficiently utilize the limited radio resources, the RRC protocol introduces a state machine associated with each user endpoint device. The allocated radio resource for a user endpoint device is then determined based on its state (RRC state). RRC states are used to allocate radio resources, with each state being associated with a different amount (or level) of the resource. For example, the RRC state machine comprises three states used in UMTS cellular networks. The three RRC states are: an IDLE state, a CELL_DCH state and a CELL_FACH state. It should be noted that the teachings of the current disclosure can be applied in other networks with different RRC state machines. As such, the embodiment as applied and described below for UMTS cellular networks is not intended to limit the scope or applicability of the current disclosure.

In one embodiment, the IDLE state refers to a default state of the user endpoint device when the user endpoint device is turned on. The user endpoint device in the IDLE state has not established an RRC connection with the RNC, thus no radio resource is allocated to the user endpoint device. A user endpoint device in the IDLE state consumes little to no energy.

The CELL_DCH state refers to a state wherein the RRC connection with the RNC is established and the user endpoint device is allocated dedicated transport channels in both downlink (RNC to user endpoint device) and uplink (user endpoint device to RNC) directions. The CELL_DCH state allows the user endpoint device to fully utilize the radio resources for user data transmission. A user endpoint device in the CELL_DCH state has the highest amount of energy consumption and the maximum bandwidth.

The CELL_FACH state refers to a state wherein the RRC connection is established with the RNC, but there is no dedicated channel allocated to the user endpoint device. Instead, the user endpoint device can only transmit user data through shared low-speed channels (RACH for the uplink and FACH for the downlink). CELL_FACH may also be referred to as FACH. FACH is designed for applications requiring very low data throughput rate. A user endpoint device in CELL_FACH state consumes a lower level of energy and provides a lower level of access. For example, the energy consumption associated with the CELL_DCH may be 50%-100% higher than that associated with the CELL_FACH state.

Transitions between the above states (state transitions) are determined by the user endpoint device's data transmission behavior. As such, the user endpoint device may be allocated a different amount of radio resource as the user endpoint device transitions from one state to another state. Since the state transition (e.g., state promotion and state demotion) greatly impacts the energy overhead consumed by the radio interface, it is important to ensure proper closure of TCP connections.

In many applications such as web browsing, it is difficult to predict when exactly data transfers of a TCP connection will finish, since a client, e.g., a mobile endpoint device, may initiate a new request at any time after receiving the previous response. Thus a common practice is to employ an application-layer timeout to close a TCP connection. For example, Hypertext Transfer Protocol (HTTP) keep-alive timers, which are usually statically configured, are used by almost all of today's HTTP clients and servers.

TCP connections are usually closed by exchanging FIN packets between two endpoints, e.g., between a mobile endpoint device and a web server. The aforementioned timeout can cause FIN packets to be delayed by seconds to minutes after the transfer of the last user data packet. In wired networks, such delayed FIN packets are completely inconsequential in terms of resource impact. However, in third Generation (3G)/Long Term Evolution (LTE) networks, such delayed FIN packets may incur significant energy overhead consumed by the radio interface, as well as potentially high signaling load, due to the interaction with the radio-layer timer that turns off the radio interface after a certain period of inactivity. Delayed FIN packets can keep the radio interface on for a longer time by resetting the radio-layer timer, and may even trigger an additional radio state switch by turning on the radio.

The purpose of delayed closure is to increase the possibility of connection reuse, which reduces overheads such as TCP hand-shake, slow start, and Secure Socket Layer (SSL)/Transport Layer Security (TLS) handshake especially in cellular networks with high latency. On the other hand, closing a TCP connection immediately after data transfers avoids the radio energy and signaling overhead but makes reusing the connection impossible.

The present disclosure presents a method called STC (Silent TCP connection Closure), that fully addresses the above dilemma. The present method enables mobile applications to reuse TCP connections without incurring any resource overhead. A high-level aspect of STC is that given that both endpoints usually know their own timeout for closing a TCP connection, the two endpoints may exchange the timeout information, e.g., during the data transfer phase so both endpoints can then close the TCP connection silently without sending any FIN packet. Often TCP RST packets can also be triggered by timeouts and can also be eliminated by the present method in the identical way.

In one embodiment of the present disclosure, each endpoint sends to its peer the timeout information embedded in a TCP option, which is always piggybacked with user data payload to ensure reliable and in-order delivery. Henceforth, each side knows the timeout set by itself and the one set by its peer, and chooses the smaller one as the negotiated timeout for the TCP connection. In one embodiment, to address the challenge of unsynchronized clocks, the present method introduces an additional "protection period" after which the connection is finally torn down.

The present method is lightweight, backward-compatible, incrementally deployable, and easy to implement. The present method exposes simple interfaces to minimize its incurred complexity at the application layer. Given that the vast majority of today's mobile applications use HTTP, those mobile applications do not need to undergo any change since HTTP keep-alive is transparently handled by the underlying library, which only needs to be slightly modified to incorporate the present method. In addition, in one alternate embodiment, by upgrading middleboxes deployed in 3G/LTE networks, the present method can be completely transparent to servers as well, thus making all changes be confined within cellular networks.

The present disclosure is presented in view of several observations. First observation is that delayed FIN/RST packets consume radio energy and incur signaling load in cellular networks. It is noted that in 3G and LTE networks, there exists a radio-layer timeout for turning off the radio interface after a period of network inactivity. Such a timeout, called tail time, prevents frequent radio state switches (i.e., the signaling overhead). The tail timer is reset to a fixed value by any incoming or outgoing packet. When the timer ticks down to zero, the radio interface is turned off. Note that the cellular radio power contributes to as high as ⅓ to ½ of the total handset power usage for 3G and LTE.

A delayed FIN or RST lengthens the radio-on time by resetting the tail timer. To illustrate, for a loading session between an endpoint device and a web site, e.g., Google® where closing one or more TCP connections involved 5.0 sec, while the page loading finishes at 1.2 sec, then given that the tail timer is measured to be 11.0 sec, the overall radio-on time is 5.0 sec+11.0 sec=16.0 sec. In contrast, if all TCP connections are closed right after data transfers, the radio-on time will be reduced by 22.5%, i.e., 1.2 sec+0.2 sec+11.0 sec=12.4 sec (closing the connection takes 0.2 sec). But doing so prevents TCP connections from being reused for future transfers, leading to performance degradation especially in cellular networks with high latency.

If a FIN/RST delay is longer than the tail time and no other concurrent data transfer exists, the delayed FIN/RST will trigger an additional radio state switch by turning on the radio. In 3G/LTE, turning on the radio incurs up to 30 messages over control channel, causing signaling overhead.

Second observation is that delayed FINs are usually controlled by application-layer keep-alive timers. Almost all web servers have configurable keep-alive timeout settings i.e., the fixed amount of time (e.g., 5 seconds, 120 seconds, and the like) the server will wait for a subsequent request before closing the connection.

Mobile clients also use timers to close TCP connections. For example, the popular org. apache. http.client library allows developers to explicitly set the keep-alive timer for each connection. The implementation of the idle TCP connection cache (sun. net. www.http.KeepAliveCache) used by Java HTTP libraries is also examined. By default, each (remote host, remote port) pair can have at most five idle connections. Their timeout value is determined by the Keep-Alive: timeout response header, or a statically configured parameter (5 seconds by default) if the header is not provided. When the client needs to fetch a new URL, the client tries to reuse an unexpired connection in the cache. For every 5 seconds, a daemon thread scans the whole cache and closes idle connections that are timed-out. The above implementations are extensively used by Android applications.

It should be noted that the above application-layer keep-alive should not be confused with TCP keep-alive, which probes whether a TCP connection is still alive after a long period of idle time (e.g., 1 hour) if neither side closes it.

Third observation is that delayed FIN/RSTs are widespread. For example, based on studying a 10-day LTE trace consisting of 0.6 million user sessions, it was found that 51% of all TCP connections (72% of connections carrying HTTP) have FIN/RST delays of at least 1 second.

Thus, the current FIN-based scheme for closing TCP connections poses a dilemma: using delayed FINs often wastes radio energy and incurs signaling load, while prematurely tearing down connections makes reusing them impossible. In one embodiment, the present disclosure addresses this dilemma by enabling mobile applications to reuse TCP connections without incurring any resource overhead. Specifically, given that both a mobile application and the server usually know when they will close a TCP connection, both sides may exchange connection timeout information during the data transfer phase so that both sides can then close the connection silently without sending any FIN packet. Furthermore, TCP/RST packets can also be triggered by timeout which can also be eliminated by the embodiments of the present disclosure in the same way.

Embodiments of the present disclosure can be employed to address several challenges. First, embodiments of the present disclosure provide reliable and in-order delivery of the timeout information. To achieve this, in one embodiment, the timeout information is encapsulated into TCP options that are always piggybacked with TCP user data (or SYN/SYN-ACK packets), thus providing automatic guarantee of reliability and ordering.

For example, the present disclosure introduces two TCP options. The "STC-permit" option (broadly a first TCP option) is used to negotiate during a TCP handshake whether STC will be used. STC is only used if supported by both sides, e.g., the client sends the STC-permit option in a SYN packet and the server includes the STC-permit option in a SYN-ACK packet, thereby making STC incrementally deployable.

In one embodiment, the "STC-set" option (broadly a second TCP option) can be sent within an STC-enabled TCP connection by either side. The "STC-set" option contains a value x, which notifies the receiver that the sender has chosen a connection timeout period, e.g., x*100 milliseconds. In one embodiment, x takes two bytes, thereby supporting a timeout period of up to 6553.5 seconds, beyond which a four-byte value can be used. It should be noted that most TCP packets do not carry the STC-set option, which is only used when the timeout is changed or set for the first time.

As mentioned before, STC-set option messages must be piggybacked with data packets (or SYN/SYN-ACK packets) so that STC-set option messages can be retransmitted when lost, and be delivered in the same order as the STC-set option messages are sent. Doing so also guarantees that a STC-set option message does not reset the radio-layer tail timer by itself, since STC-set option message never causes any additional packet transfer. In other words, STC does not incur any additional resource overhead.

In one embodiment, the present disclosure disallows updating the connection timeout without sending user data. Supporting such an uncommon use case requires more changes to the TCP protocol, e.g., STC-set messages may need sequence numbers to ensure their delivery order. To update the timeout, an application can wait until the next data transfer, or establish a new connection.

Second, embodiments of the present disclosure provide a lightweight protocol. For the ease of presentation, the present disclosure focuses on the client-side logic. The server-side logic is identical as STC does not distinguish between a client and a server.

For an STC-enabled TCP connection, the client's TCP stack maintains two variables: $T_{client}$ (broadly a first variable) and $T_{server}$ (broadly a second variable) corresponding to the connection timeout specified by the client (itself) and the server, respectively, using the STC-set option. The client's TCP also maintains an inactivity timer Π, which is reset by any network activity of the connection. When Π ticks down to zero, the connection is about to be closed silently. The detailed logic is as follows.

1. Initially, both $T_{client}$ and $T_{server}$ are set to ∞. Π is also set to ∞ (i.e., never expires).

2. When the client successfully receives an STC-set option with timeout x, it sets $T_{server}$ to x. Here "successfully received" means that the expected sequence number matches the sequence number of the associated data packet, which is then delivered to the upper layer. Similarly, when the client successfully sends an STC-set option with timeout x, the client sets $T_{client}$ to x. Here "successfully sent" implies that the client receives an ACK packet that acknowledges the reception of the data packet associated with STC-set option. The above mechanisms ensure that an endpoint applies its peer's timers in the same order in which its peer sets the timers, since their associated data packets are delivered in order.

3. Usually both SYN packet and SYN-ACK packet contain the STC-set option. Thus, at the client side, both $T_{client}$ and $T_{server}$ are initialized when the SYN-ACK packet is received. At the server side, $T_{client}$ (maintained by the server) is initialized when the SYN packet is received, and $T_{server}$ is initialized when the last ACK packet in the TCP three-way handshake is received.

4. The inactivity timer Π is reset to min $\{T_{client}, T_{server}\}$ when the connection sends or receives any packet associated with it. Resetting Π indicates the network activity of the connection. Step 4 always occurs after Steps 2 and 3 if the packet contains an STC-set option message.

5. When Π expires, the TCP connection is closed silently after a short duration (as described below).

Third, embodiments of the present disclosure provide unsynchronized timers. Due to the network latency and its variability, the inactivity timer Π at both sides are not strictly synchronized, leading to potential inconsistency that the timer Π at one side has expired but the timer Π at the other side has not. In order to prevent an undesired situation where an endpoint sends data to its remote peer who has already closed the connection silently (broadly referred to as an "undesired silent closure"), on either side, when the timer Π expires, the connection is not closed immediately. Instead, the connection will enter a "protection" period of time (broadly a predefined period of time) during which the connection can only receive incoming data but is not allowed to send any data. However, upon the reception of any data, the connection immediately exits the protection period and becomes fully active by resetting the timer Π to min $\{T_{client}, T_{server}\}$. The protection period has a small impact on applications, as described below.

Figure 2:
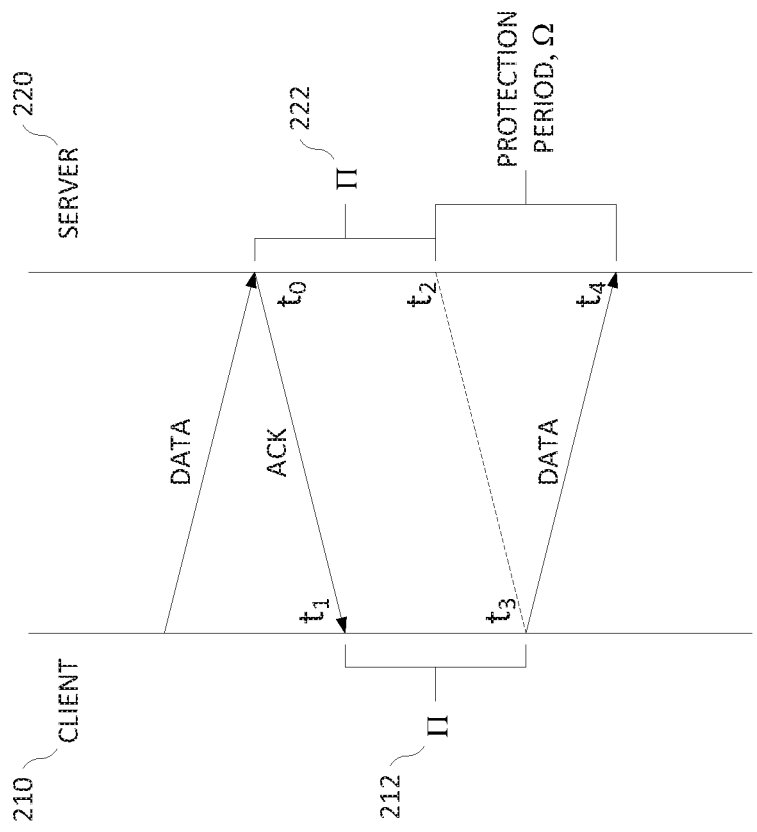
FIG. 2 illustrates an example of a protection period.

In one embodiment, the connection will finally be closed when the protection period ends with no incoming packet. The duration of the protection period is controlled by another timer, e.g., an inactivity timer Ω. To determine how to set this timer, consider an example shown in FIG. 2. The client device 210 and server 220 reset their Π timers at $t_1$ and $t_0$, respectively. Right before the client's Π timer 212 expires at $t_3$, the client device sends a data packet, which arrives at the server at $t_4$. However, the server's Π timer 222 has already expired at $t_2$. Therefore, in order to eliminate the possibility of receiving data after silently closing a connection (i.e., an undesired silent closure), the server's protection period should be at least $t_4-t_2=(t_4-t_3)+(t_1-t_0)$=Round-trip time (RTT). Round-trip time (RTT), also called round-trip delay, is the time required for a packet to travel from a specific source to a specific destination and back again. In one embodiment, the Ω timer can be statically or dynamically set to be far greater than a normal RTT.

Figure 3:
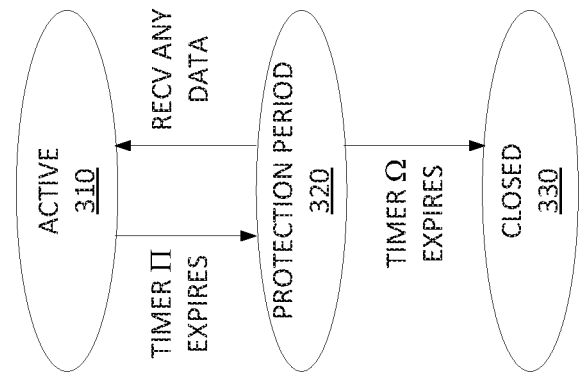
FIG. 3 illustrates state transitions.

FIG. 3 summarizes the state transitions in STC. The connection will remain in the active state 310 as long as the Π timer has not expired. When the Π timer expires, the connection will enter the protection period state 320. If any data is received when the connection is in the protection period state 320, the connection will revert back to the active state 310. If no data is received and the Ω timer expires, then the connection will enter the closed state 330.

When experiencing packet losses, the Π timer difference between two endpoints can be larger. In one embodiment, one can add extra rules to prevent an undesired silent closure due to poor network condition. In FIG. 3, even if the Π timer expires, the transition from an active connection 310 to the protection period 320 will not occur if any of the following conditions holds: (i) there are unacknowledged packets, (ii) there are unreceived packets (i.e., receiving packet(s) with higher sequence number(s) than expected), (iii) either the TCP sending buffer or the receiving buffer is not empty. This can happen when the end-host's CPU is busy.

In one embodiment, the protection period ensures that STC does not cause data packet loss at the end of a TCP connection due to a lack of an explicit FIN packet. However, if the protection period is not long enough, an undesired silent closure can occur. In that case, the endpoint that observes the incoming data will reply with a TCP RST packet without acknowledging the data, so the remote peer's TCP stack will close the corresponding connection and notify the application about the failed delivery, and the application will establish a new connection so the correctness of the application logic is not affected. However, it is expected that this situation will only occur rarely given the aforementioned measures that can be taken against an undesired silent closure.

In one embodiment, STC provides two interfaces to applications:

Socket options for enabling STC and setting connection timeout to be piggybacked with the next user data.

Interface for applications to query the state of a connection and its remaining lifetime (i.e., the Π timer).

For example, the above interfaces can be achieved by setsockopt ( ) and getsockopt ( ) system calls. Other socket application-programming interfaces (APIs) such as send ( ) and recv ( ) are not changed. Also, traditional FIN and RST can still be used at any time (e.g., by explicitly calling close (»), and they can override the present STC mechanism. Using delayed FIN is discouraged, but RST is still useful in case of an error.

Several examples will illustrate how existing applications can be easily adapted to STC when it is enabled. First, a web server using STC does not explicitly close a connection by calling close ( ). Instead, when a connection is silently closed by TCP, the server performs clean-up as if the connection is explicitly closed. A connection in the protection period is treated the same as an active connection since a web server does not initiate an HTTP transaction so the web server naturally only receives data during the protection period. Second, a client HTTP library will be changed in a similar way except that a connection in the protection period should not be used to send a request. Third, most smartphone applications use HTTP. These applications can remain untouched if the underlying libraries manage the TCP connections transparently. Almost all popular HTTP libraries satisfy such a requirement.

In TCP, an active closer who initiates the connection close will eventually enter a state called TIME_WAIT before closing the connection. In TIME_WAIT, the endpoint waits for a fixed amount of time (e.g., twice the maximum lifetime of a packet) during which the four-tuple (src IP/port, dst IP/port) defining the connection cannot be reused. This eliminates an undesired situation where a packet belonging to the old connection is delivered later to a newly created connection with the same four-tuple. There is no need for the other endpoint to stay in TIME_WAIT. If both sides send FIN simultaneously, then both sides will hold TIME_WAIT. In STC, since it is impossible to tell which side is the active closer, a new rule can be applied: in a silent closure, the endpoint that sends SYN packet will hold TIME_WAIT while the other endpoint will directly move to the final CLOSED state. If both sides send the SYN packet simultaneously, then both sides will hold TIME_WAIT.

It should be noted that a legacy Network Address Translation (NAT) box not recognizing STC does not affect the functionality of STC. But when silently closed, a connection will not be removed from the connection table of the NAT box. Instead, it will be eventually removed by timeout at the NAT box, ranging from less than 5 minutes to more than 30 minutes in today's cellular networks. This is largely not an issue since NAT box scales well with the number of entries. It uses efficient hash-based lookup, such that 10K entries may consume only 3 MB of RAM.

However, if NAT boxes are aware of STC, additional benefits can be achieved even for long-lived connections. Carriers often configure their NAT boxes to have short TCP connection timeout. This affects long-lived connections used by, for example, chat applications and push notifications, which must send application-level keep-alive messages to prevent the connections from being closed by NAT timeout. Such keep-alive messages, if frequently sent, can cause significant handset energy waste due to the tail time. NAT boxes use timeout because they do not know when connections will close. STC instead provides a way to explicitly inform the NAT box of the lifetime of a connection, thus making it unnecessary for applications to send frequent keep-alive messages.

Cellular carriers also deploy general-purpose proxies for purposes such as caching and compression. From the perspective of TCP connection management, proxies could be classified into two types: split proxies (SP) and non-split proxies (NSP). The former splits an end-to-end TCP connection into two, one between the handset and the proxy and the other between the proxy and the remote server. An SP makes the split transparent to handsets by spoofing proxy's IP address to be the server's IP address. In contrast, an NSP is less intrusive. It does not split TCP connections traversing it but can modify packets on the fly.

Carriers have strong incentives to make their proxies STC capable: regardless of its type, as long as a proxy supports STC, there is no need to modify remote servers (or any network element on the upstream path of the proxy). Therefore all changes can be confined within cellular networks. But a server can still choose to support STC for customized control over the connection timeout.

Specifically, when a split-proxy (SP) is present, it must recognize STC otherwise only traditional FIN/RST packet can be used even if both the handset and the server support STC. Adding STC support to an SP is the same as upgrading a server, as described above. For a non-split-proxy (NSP), STC can function if both endpoints support it but the NSP does not (similar to the case of the NAT box). Making an NSP STC-capable is also easy. Assume a handset sends a SYN packet with STC-permit option and usually STC-set option. If the original server sends a SYN-ACK packet with STC-permit option, the NSP can then let the server handle STC. Otherwise, since the server does not support STC, the NSP modifies the original SYN-ACK packet from the server by adding the STC-permit option and the STC-set option. Also, in the data transfer phase, the NSP attaches STC-set option to the data packets from the server based on its own policy (e.g., setting $T_{server}$ to be longer than $T_{client}$ is recommended). When the connection is closed silently, the NSP sends a RST packet to the STC-unaware server on behalf of the handset but there is no packet exchange between the NSP and the handset.

Furthermore, firewalls can be configured to disable STC by removing the STC-permit option. This makes the use of STC fully controllable.

Thus, STC reduces the resource overhead of delayed FIN/RST by eliminating these packets at the TCP layer by using a lightweight protocol. Furthermore, STC addresses the delayed FIN/RST problem in cellular networks. Embodiments of the present disclosure are lightweight, backward-compatible, incrementally deployable, and easy to implement. Namely, STC enables mobile applications to reuse TCP connections without incurring any resource overhead while prior to STC, it was difficult to achieve both advantages at the same time.

Figure 4:
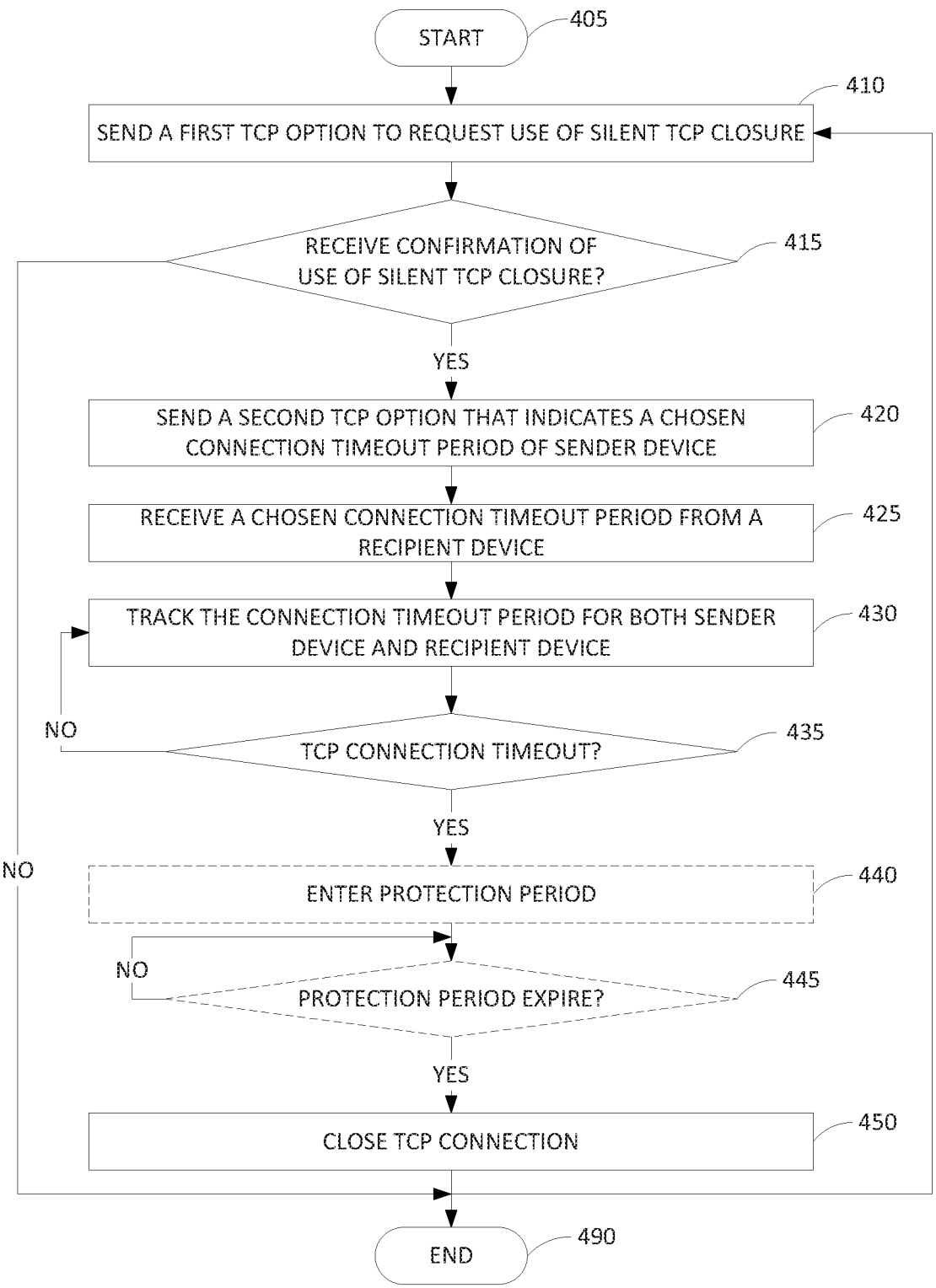
FIG. 4 illustrates a flowchart of a method for closing a TCP connection.

FIG. 4 illustrates a flowchart of a method 400 for closing a TCP connection. For example, FIG. 4 illustrates a method for providing a silent TCP connection closure as discussed above. In one embodiment, the method 400 can be implemented in a user endpoint device 112, a server 140 or a general purpose computer having a processor, a memory and input/output devices as discussed below in reference to FIG. 5. The method 400 is described below from the perspective of the sender device, e.g., a user endpoint device interacting with a recipient device, e.g., a web server. The method 400 starts in step 405 and proceeds to step 410.

In step 410, method 400 sends a packet, e.g., a SYN packet, that containing a first TCP option, e.g., a STC-permit option, that requests the use of a silent TCP closure for closing a TCP connection that is to be established between the sender device, and a recipient device, e.g., a web server. The silent TCP closure does not require the transmission of FIN or RST packets (broadly TCP connection closure packets). Instead, each side of the TCP connection will implement timers to track chosen timeout periods that are exchanged between the two sides of the TCP connection.

In step 415, method 400 determines whether a confirmation is received from the recipient device that the silent TCP closure will be used by the recipient device. In other words, method 400 determines whether the negotiation for the use of silent TCP closure is successful. For example, if a SYN-ACK packet is received carrying the STC-permit option, then the negotiation for the use of silent TCP closure is successful and the method proceeds to step 420. If a SYN-ACK packet is received without the STC-permit option, then the negotiation for the use of silent TCP closure was unsuccessful and the method proceeds to step 490 where method 400 ends. Namely, the silent TCP closure will not be used for the TCP connection.

In step 420, method 400 sends a second TCP option, e.g., STC-set option, that indicates a chosen connection timeout period of the sender device.

In step 425, method 400 receives a STC-set option from the recipient device that indicates a chosen connection timeout period of the recipient device.

In step 430, method 400 tracks the chosen connection timeout period of the sender device and the chosen connection timeout period of the recipient device. For example, timers are used to track the two connection timeout periods.

In step 435, method 400 determines whether the TCP connection timeout period has been reached. For example, method 400 determines whether the shorter time period between the chosen connection timeout period of the sender device and the chosen connection timeout period of the recipient device has elapsed. If the TCP connection timeout period has not been reached, method 400 returns to step 430. If the TCP connection timeout period has been reached, method 400 proceeds to step 440.

In step 440, method 400 may optionally enter into a protection time period. For example, the sender device may wait for a duration predefined for a protection time period before silent TCP closure is implemented. As discussed above, since the internal clocks of the sender device and the recipient device are not synchronized, postponing the closure of the TCP connection for the duration of the protection time period will avoid the "undesired silent closure".

In step 445, method 400 determines whether the protection time period has elapsed or expired. If the protection time period has not been reached, method 400 continues to monitor the timer tracking the protection time period. If the protection time period has expired or elapsed, method 400 proceeds to step 450.

In step 450, method 400 closes the TCP connection for the sender device side of the TCP connection. It should be noted that the TCP connection is closed without receiving a FIN or RST packet. Method 400 ends in step 490 or returns to step 410 to establish a new TCP connection.

In addition, although not specifically specified, one or more steps, functions or operations of the method 400 may include a storing, displaying and/or outputting step as required for a particular application. In other words, any data, records, fields, and/or intermediate results discussed in the method can be stored, displayed and/or outputted either on the device executing the method or to another device, as required for a particular application.

Furthermore, steps, blocks, functions or operations in FIG. 4 that recite a determining operation or involve a decision do not necessarily require that both branches of the determining operation be practiced. In other words, one of the branches of the determining operation can be deemed as an optional step. Furthermore, steps, blocks, functions or operations of the above described methods can be combined, separated, and/or performed in a different order from that described above, without departing from the example embodiments of the present disclosure.

Figure 5:
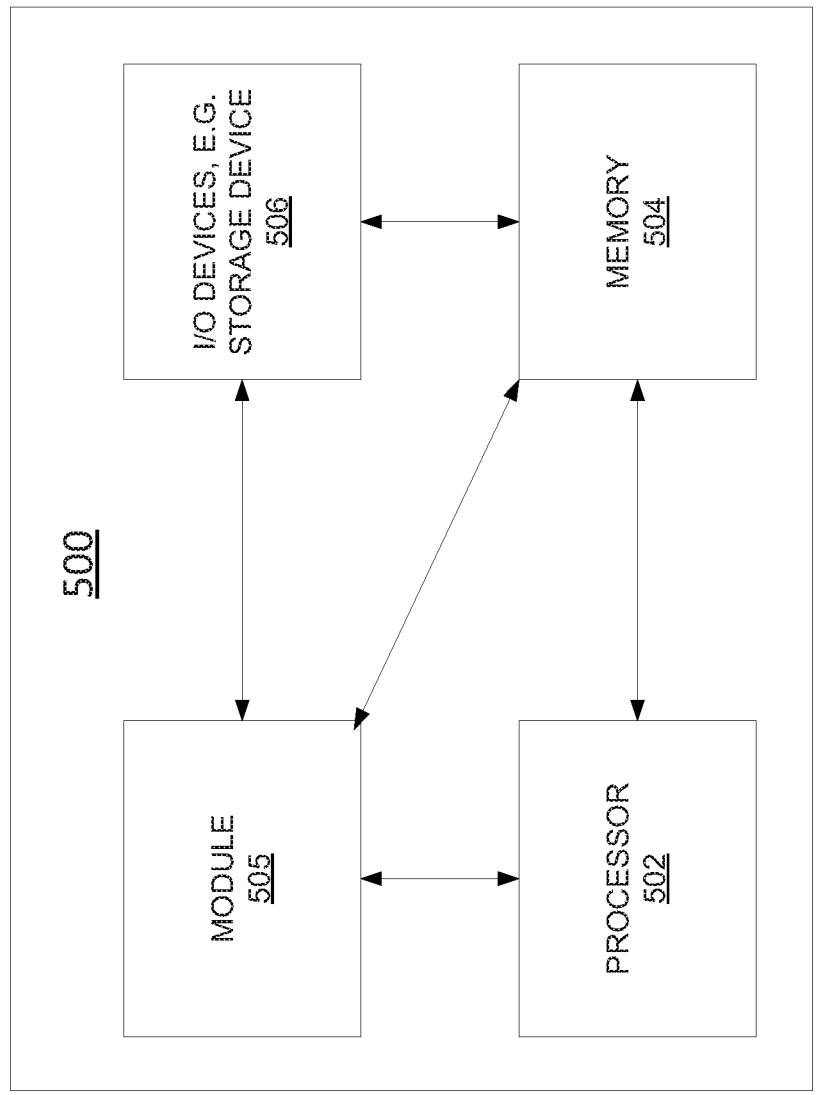
FIG. 5 illustrates a high-level block diagram of a general-purpose computer suitable for use in performing the functions described herein.

FIG. 5 depicts a high-level block diagram of a general-purpose computer suitable for use in performing the functions described herein. As depicted in FIG. 5, the system 500 comprises one or more hardware processor elements 502 (e.g., a central processing unit (CPU), a microprocessor, or a multi-core processor), a memory 504, e.g., random access memory (RAM) and/or read only memory (ROM), a module 505 for closing a TCP connection, and various input/output devices 506 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the general-purpose computer may employ a plurality of processor elements. Furthermore, although only one general-purpose computer is shown in the figure, if the method(s) as discussed above is implemented in a distributed or parallel manner for a particular illustrative example, i.e., the steps of the above method(s) or the entire method(s) are implemented across multiple or parallel general-purpose computers, then the general-purpose computer of this figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 505 for closing a TCP connection (e.g., a software program comprising computer-executable instructions) can be loaded into memory 504 and executed by hardware processor element 502 to implement the steps, functions or operations as discussed above in connection with the exemplary method 400. Furthermore, when a hardware processor executes instructions to perform "operations", this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 505 for closing a TCP connection (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for closing a transmission control protocol connection in a wireless network, the method comprising:
 receiving, by a processor of a recipient device, a first transmission control protocol option requesting a use of a silent transmission control protocol closure for the transmission control protocol connection;
 receiving, by the processor, a second transmission control protocol option that indicates a connection timeout period for a sender device;

sending, by the processor, a connection timeout period for the recipient device;

tracking, by the processor, the connection timeout period for the sender device and the connection timeout period for the recipient device; and closing, by the processor, the transmission control protocol connection when one of the connection timeout period for the sender device or the connection timeout period for the recipient device has expired.

2. The method of claim 1, further comprising:

waiting for a protection time period after one of the connection timeout period for the sender device or the connection timeout period for the recipient device has expired, before closing the transmission control protocol connection.

3. The method of claim 2, wherein the protection time period is set to be at least as long as a round-trip time period determined between the sender device and the recipient device.

4. The method of claim 1, wherein the wireless network comprises a cellular network.

5. The method of claim 1, wherein the sender device comprises a mobile endpoint device.

6. The method of claim 1, wherein the recipient device comprises a server.

7. The method of claim 1, wherein the closing of the transmission control protocol connection is accomplished without receiving a FIN packet.

8. The method of claim 1, wherein the closing of the transmission control protocol connection is accomplished without receiving a RST packet.

9. A computer-readable storage device storing instructions which, when executed by a processor of a recipient device, cause the processor to perform operations for closing a transmission control protocol connection in a wireless network, the operations comprising:

receiving a first transmission control protocol option requesting a use of a silent transmission control protocol closure for the transmission control protocol connection;

receiving a second transmission control protocol option that indicates a connection timeout period for a sender device;

sending a connection timeout period for the recipient device;

tracking the connection timeout period for the sender device and the connection timeout period for the recipient device; and closing the transmission control protocol connection when one of the connection timeout period for the sender device or the connection timeout period for the recipient device has expired.

10. The computer-readable storage device of claim 9, the operations further comprising:

waiting for a protection time period after one of the connection timeout period for the sender device or the connection timeout period for the recipient device has expired, before closing the transmission control protocol connection.

11. The computer-readable storage device of claim 10, wherein the protection time period is set to be at least as long as a round-trip time period determined between the sender device and the recipient device.

12. The computer-readable storage device of claim 9, wherein the wireless network comprises a cellular network.

13. The computer-readable storage device of claim 9, wherein the sender device comprises a mobile endpoint device.

14. The computer-readable storage device of claim 9, wherein the recipient device comprises a server.

15. The computer-readable storage device of claim 9, wherein the closing of the transmission control protocol connection is accomplished without receiving a FIN packet.

16. The computer-readable storage device of claim 9, wherein the closing of the transmission control protocol connection is accomplished without receiving a RST packet.

17. An apparatus for closing a transmission control protocol connection in a wireless network, the apparatus comprising:

a processor of a recipient device; and a computer-readable storage device storing a plurality of instructions which, when executed by the processor, cause the processor to perform operations, the operations comprising:

receiving a first transmission control protocol option requesting a use of a silent transmission control protocol closure for the transmission control protocol connection;

receiving a second transmission control protocol option that indicates a connection timeout period for a sender device;

sending a connection timeout period for the recipient device;

tracking the connection timeout period for the sender device and the connection timeout period for the recipient device; and closing the transmission control protocol connection when one of the connection timeout period for the sender device or the connection timeout period for the recipient device has expired.

18. The apparatus of claim 17, the operations further comprising:

waiting for a protection time period after one of the connection timeout period for the sender device or the connection timeout period for the recipient device has expired, before closing the transmission control protocol connection.

19. The apparatus of claim 18, wherein the protection time period is set to be at least as long as a round-trip time period determined between the sender device and the recipient device.

20. The apparatus of claim 17, wherein the wireless network comprises a cellular network.

* * * * *